Nov. 13, 1928.                                                                                   1,691,458
C. BENEDICKS
METHOD OF TREATING LIQUIDS
Filed Jan. 29, 1925
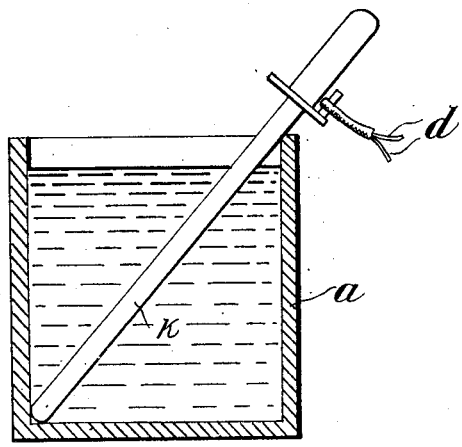
Inventor
Carl Benedicks.
per
Attorney.

Patented Nov. 13, 1928.

1,691,458

UNITED STATES PATENT OFFICE.

CARL BENEDICKS, OF STOCKHOLM, SWEDEN.

METHOD OF TREATING LIQUIDS.

Application filed January 29, 1925, Serial No. 5,537, and in Sweden July 2, 1924.

If moist air is allowed to come into contact with an object which is materially colder than the air, the moisture is apt to deposit on the object in question, whereby the air is subjected to a certain drying effect. This well known condition corresponds to what is known as "the effect of the cold wall". The said effect has been technically utilized in recent years for liberating a gas from contaminations by causing the gas to flow past a cold wall (freezing out).

Likewise, it is well known that a liquid will, to a certain extent, be liberated from contaminations, that is to say such as are separated in the solid state at a lower temperature, by bringing the liquid into contact with a colder body on which a greater or smaller portion of these contaminations are then caused to deposit. In this way, it is known, for example, to purify diluted solutions of salt.

If, instead, a liquid is under consideration, a "liquid" being in the following understood to comprise a liquid in the ordinary sense of the word, a molten mass, or any other body in a more or less liquid state, such liquid or body containing a substance which is gaseous per se, for instance, water containing air, the conditions will be found to be apparently paradoxical. A cold body will then be found to be without any influence in the said respect; instead, the fact is, as has been found by applicant, that if a liquid is allowed to come into contact with a body which is materially warmer, the composition of the liquid will be subjected to a marked alteration, in that the present quantity of gas will be separated to a great extent on the hot body.

In analogy with the denomination given above, I shall designate this condition as "the effect of the hot wall"; it may be said to involve the condition that the partial pressure for a gas present in a liquid or molten mass is dependent on the highest temperature prevailing within the liquid and that, therefore, the gas is caused to separate on the hot wall.

The present invention refers to a method of and means for the technical utilization of this peculiar physical effect in such cases where a liquid or molten mass is to be liberated from gas dissolved in the same or contained therein in a separated state, as for instance, a body of molten glass from air, and so forth.

The method consists in that the liquid to be so purified is brought into contact with a body which is heated by special means to a temperature higher than that of the liquid. This body may consist of a portion of the vessel in which the liquid is contained, but it may also consist of a separate body outside the one where the liquid is to be stored, used, treated, and so forth.

A means for realizing the method consists of a body which is in contact with the liquid and adapted to be kept at a temperature higher than that of the liquid by means of specially supplied heat, a relative movement with respect to the liquid being preferably imparted to the said body, either so that the liquid is allowed to flow past the said body, or by the liquid standing still while the body is moving in the liquid, or by the liquid as well as the body being movable.

While my improved method may be carried out by various different means, a simple form is illustrated in the accompanying drawing. As illustrated, the liquid or molten mass to be treated is placed in a container $a$ and a heated body K is moved through and around the liquid in the container. The member K may be heated in any preferred manner, such, for example, as be an electric current supplied by wires $d$, it being merely necessary that the member be brought to a higher temperature that the liquid or mass under treatment. Movement of the member K through the mass will cause gas bubbles to adhere thereto, and by moving the member into and out of the mass, the gas bubbles may be readily removed and permitted to escape into the atmosphere.

As previously indicated, the invention has particular utility in the treatment of molten masses of glass, quartz, or the like, and especially in the production of optical glass, wherein the presence of a few gas bubbles may render a whole block of glass worthless. By the present invention, all of the undesirable air and gas contained in the original molten mass of glass can be readily removed in a very short time, thereby eliminating the waste of material which heretofore characterized the production of glass.

What I claim as new and desire to secure by Letters Patent of the United States of America is:—

1. A method of liberating a molten mass from gas present therein which comprises stirring the molten mass by means of a body having higher temperature than that of the molten mass, the separation of the gas being localized on said body.

2. A method of liberating a molten mass from gas present therein, which comprises stirring the molten mass by means of a body heated electrically to a higher temperature than that of the molten mass, the separation of the gas being localized on said body.

3. A method of liberating a molten mass from gas present therein which comprises stirring the molten mass by means of a body having higher temperature than that of the molten mass, the separation of the gas being localized on said body, and removing the body from the mass to permit the gas to escape into the atmosphere.

In testimony whereof I affix my signature.

CARL BENEDICKS.